(12) United States Patent
Beck et al.

(10) Patent No.: US 11,059,609 B2
(45) Date of Patent: Jul. 13, 2021

(54) SATELLITE DEPLOYER WITH EXTERNALLY ADJUSTABLE PAYLOAD RESTRAINT

(71) Applicant: Rocket Lab USA, Inc., Huntington Beach, CA (US)

(72) Inventors: Peter Beck, Auckland (NZ); Peter Barlow, Huntington Beach, CA (US); David Yoon, La Crescenta, CA (US); Ben Malcolm, Auckland (NZ)

(73) Assignee: Rocket Lab USA, Inc., Huntington Beach, CA (US)

( * ) Notice: Subject to any disclaimer, the term of this patent is extended or adjusted under 35 U.S.C. 154(b) by 400 days.

(21) Appl. No.: 16/051,271

(22) Filed: Jul. 31, 2018

(65) Prior Publication Data
US 2019/0039757 A1 Feb. 7, 2019

Related U.S. Application Data

(60) Provisional application No. 62/541,493, filed on Aug. 4, 2017.

(51) Int. Cl.
*B64G 1/22* (2006.01)
*F16C 29/00* (2006.01)
(Continued)

(52) U.S. Cl.
CPC .................. *B64G 1/22* (2013.01); *B26D 5/12* (2013.01); *B60P 7/135* (2013.01); *B60P 7/16* (2013.01);
(Continued)

(58) Field of Classification Search
CPC .......... B64G 1/22; B64G 1/645; B64G 1/222; B64G 1/007; B64G 1/641; B64G 1/0005; E05D 3/08; E05D 7/00; E05F 3/20; E05F 1/105; B60P 7/135; B60P 7/16; B26D 5/12; F16C 29/005; F16C 33/24;
(Continued)

(56) References Cited

U.S. PATENT DOCUMENTS 3,144,956 A 8/1964 Anderson
3,991,649 A 11/1976 Patrichi
(Continued)

FOREIGN PATENT DOCUMENTS

CN 106081170 A 11/2016
KR 20160147547 A 12/2016
WO 2008034550 A1 3/2008

OTHER PUBLICATIONS

Holemans et al. "Canisterized Satellite Dispenser (CSD) as a Standard for Integrating and Dispensing Hosted Payloads on Large Spacecraft and Launch Vehicles", May 2014.*
(Continued)

*Primary Examiner* — Assres H Woldemaryam
(74) *Attorney, Agent, or Firm* — Van Pelt, Yi & James LLP

(57) ABSTRACT

A satellite dispenser and method of using same are disclosed. In various embodiments, a satellite dispenser as disclosed herein includes a dispenser body defining an interior cavity to accommodate a payload; and a plurality of externally adjustable restraints positioned within the interior cavity and configured to be extended further into the interior cavity by actuation of a manual interface external to the interior cavity.

16 Claims, 5 Drawing Sheets

(51) Int. Cl.
| | |
|---|---|
| *F16C 33/24* | (2006.01) |
| *E05D 3/08* | (2006.01) |
| *E05D 7/00* | (2006.01) |
| *E05F 3/20* | (2006.01) |
| *B60P 7/135* | (2006.01) |
| *B60P 7/16* | (2006.01) |
| *B26D 5/12* | (2006.01) |
| *E05F 1/10* | (2006.01) |
| *B64G 1/64* | (2006.01) |
| *B64G 1/00* | (2006.01) |
| *F42B 3/00* | (2006.01) |

(52) U.S. Cl.
CPC .............. *E05D 3/08* (2013.01); *E05D 7/00* (2013.01); *E05F 1/105* (2013.01); *E05F 3/20* (2013.01); *F16C 29/005* (2013.01); *F16C 33/24* (2013.01); *B64G 1/007* (2013.01); *B64G 1/222* (2013.01); *B64G 1/645* (2013.01); *E05Y 2201/216* (2013.01); *E05Y 2201/426* (2013.01); *E05Y 2900/50* (2013.01); *E05Y 2900/531* (2013.01); *F16C 2208/82* (2013.01); *F16C 2223/32* (2013.01); *F16C 2326/47* (2013.01); *F42B 3/006* (2013.01)

(58) Field of Classification Search
CPC .............. F16C 2223/32; F16C 2208/82; F16C 2326/47; E05Y 2201/216; E05Y 2201/426; E05Y 2900/50; E05Y 2900/531; F42B 3/006
See application file for complete search history.

(56) References Cited

U.S. PATENT DOCUMENTS

| | | | |
|---|---|---|---|
| 4,210,274 A | 7/1980 | Leonard | |
| 4,540,873 A | 9/1985 | Kester | |
| 4,771,971 A | 9/1988 | Ludwig | |
| 4,779,826 A | 10/1988 | Kiendl | |
| 4,936,367 A | 6/1990 | Marello | |
| 4,984,666 A | 1/1991 | Orii | |
| 5,050,821 A | 9/1991 | Kerstein | |
| 5,109,571 A | 5/1992 | Ohshima | |
| 5,364,046 A | 11/1994 | Dobbs | |
| 5,462,800 A | 10/1995 | Yamazaki | |
| 5,664,897 A | 9/1997 | Hennings | |
| 5,743,492 A | 4/1998 | Chan | |
| 5,755,406 A | 5/1998 | Aston | |
| 5,755,407 A | 5/1998 | Aubret | |
| 5,848,766 A | 12/1998 | Thompson | |
| 6,126,115 A | 10/2000 | Carrier | |
| 6,227,493 B1 | 5/2001 | Holemans | |
| 6,357,699 B1 | 3/2002 | Edberg | |
| 6,532,628 B2 | 3/2003 | Kim | |
| 6,668,985 B2 | 12/2003 | Krenkel | |
| 6,869,048 B2 | 3/2005 | Draisey | |
| 6,886,221 B2 | 5/2005 | Minami | |
| 6,901,836 B1 | 6/2005 | Valembois | |
| 6,904,644 B2 | 6/2005 | Oshima | |
| 6,905,097 B2 | 6/2005 | Blackwell-Thompson | |
| 7,065,834 B2 | 6/2006 | Lowry | |
| 7,107,648 B1 | 9/2006 | Lu | |
| 7,111,773 B1 | 9/2006 | So | |
| 7,155,780 B2 | 1/2007 | Chen | |
| 7,213,301 B2 | 5/2007 | Sakai | |
| 7,350,664 B2 | 4/2008 | Nam | |
| 7,386,918 B2 | 6/2008 | Tomizawa | |
| 7,401,381 B2 | 7/2008 | Konja | |
| 7,543,357 B2 | 6/2009 | Ishikawa | |
| 7,634,838 B2 | 12/2009 | Ge | |
| 7,699,378 B2 | 4/2010 | Smith | |
| 7,712,186 B2 | 5/2010 | Kang | |
| 7,814,620 B2 | 10/2010 | Lin | |
| 8,079,115 B2 | 12/2011 | Zhang | |
| 8,132,292 B2 | 3/2012 | Patterson | |
| 8,424,160 B2 | 4/2013 | Chen | |
| 8,432,677 B2 | 4/2013 | Duan | |
| 8,459,754 B2 | 6/2013 | Cho | |
| 8,745,820 B2 | 6/2014 | Janak | |
| 8,769,770 B2 | 7/2014 | Kullman | |
| 9,115,519 B2 | 8/2015 | Li | |
| 9,289,879 B2 | 3/2016 | Copeland | |
| 9,290,880 B2 | 3/2016 | Park | |
| 9,394,645 B2 | 7/2016 | Park | |
| 9,414,724 B2 | 8/2016 | Vallance | |
| 9,434,486 B1* | 9/2016 | Santos | B64G 1/64 |
| 9,464,376 B2 | 10/2016 | Kim | |
| 9,725,940 B2 | 8/2017 | Lambright | |
| 9,796,488 B2 | 10/2017 | Cook | |
| 10,011,373 B1 | 7/2018 | Echelman | |
| 10,017,279 B2 | 7/2018 | Poncet | |
| 10,053,243 B2 | 8/2018 | Apland | |
| 10,370,124 B2 | 8/2019 | Dube | |
| 10,569,910 B2 | 2/2020 | Bogdanov | |
| 10,689,133 B2 | 6/2020 | Cheynet De Beaupre | |
| 10,773,831 B2 | 9/2020 | Wang | |
| 2003/0192522 A1 | 10/2003 | Taryoto | |
| 2005/0045771 A1 | 3/2005 | Caldwell | |
| 2005/0230562 A1 | 10/2005 | Buehler | |
| 2006/0049317 A1* | 3/2006 | Reutenauer | B64G 1/222 244/172.9 |
| 2012/0112010 A1 | 5/2012 | Young | |
| 2012/0280085 A1 | 11/2012 | Sinclair | |
| 2013/0099059 A1 | 4/2013 | Cheynet De Beaupre | |
| 2013/0282117 A1* | 10/2013 | Van Heugten | A61F 2/14 623/6.22 |
| 2014/0117028 A1 | 5/2014 | Huber | |
| 2014/0131521 A1* | 5/2014 | Apland | B64G 1/641 244/173.3 |
| 2014/0319283 A1* | 10/2014 | Holemans | B64G 1/641 244/173.3 |
| 2016/0075452 A1 | 3/2016 | Robles | |
| 2016/0200459 A1 | 7/2016 | Aston | |
| 2016/0207605 A1 | 7/2016 | Jensen | |
| 2017/0072647 A1 | 3/2017 | Perrillat et al. | |
| 2017/0081011 A1 | 3/2017 | Matthews | |
| 2017/0174368 A1 | 6/2017 | Dube | |
| 2017/0225873 A1 | 8/2017 | Fougere | |
| 2017/0320597 A1 | 11/2017 | Lim | |
| 2017/0327253 A1 | 11/2017 | Bogdanov | |
| 2018/0194494 A1 | 7/2018 | Dube | |

OTHER PUBLICATIONS

Donaldson et al. "Ejection and Recovery System for Cubesat Sized Ejectables on Sounding Rockets". Apr. 22, 2017. Retrieved from the Internet on Sep. 19, 2018. URL: <https://web.archive.org/web/20170422053555/http://rexusbexus.net/wp-content/uploads/2015/06/Suineadh-_IAC-Paper.pdf>.

"Small Spacecraft Technology State of the Art", Dec. 2015, NASA Mission Design Division, pp. 125-129 (Year: 2015).

* cited by examiner

SATELLITE DEPLOYER WITH EXTERNALLY ADJUSTABLE PAYLOAD RESTRAINT

CROSS REFERENCE TO OTHER APPLICATIONS

This application claims priority to U.S. Provisional Patent Application No. 62/541,493 entitled SMALL SCALE SATELLITE DEPLOYER filed Aug. 4, 2017 which is incorporated herein by reference for all purposes.

GOVERNMENT LICENSE RIGHTS

This invention was made with Government support under Contract No. 2014-14031000011 awarded by a United States Government Agency. The United States Government has certain rights in the invention.

BACKGROUND OF THE INVENTION

Small scale satellites, such as CubeSat or other small satellites, may be launched into space in a launch vehicle that includes a plurality of such satellites, each contained in a "dispenser" device, sometimes referred to as a small scale satellite "deployer", configured to deploy the small scale satellite in a controlled manner, e.g., to achieve a target orbit. The terms "dispenser" and "deployer" are used interchangeably in this specification.

Satellites conforming to the CubeSat Design Specification may have a size and form factor of a corresponding type or class of CubeSat as defined by the standard. The size and form factor of a CubeSat is based on a standard 10×10×11.35 cm3 unit designed to provide 10×10×10 cm3 (or 1 liter) of useful volume. CubeSats of different types may comprise a different number of such units. For example, CubeSats comprising 1, 3, 6, or 12 units, sometimes designated as 1 U, 3 U, 6 U, and 12 U CubeSats, respectively, may be encountered. Other satellites comprising other whole or fractional numbers of standard units may be launched and deployed.

Small scale satellite dispensers typically have a shape, size, and form factor to accommodate a corresponding small scale satellite, and commonly have a door that provides access to a payload area of the dispenser. The small scale satellite (payload) is loaded into the dispenser through the opening associated with the door, with the door in the open position. The door is closed and secured in the closed position. The dispenser may be arranged with other dispensers in a chassis configured to accommodate multiple dispensers. The chassis is loaded into a launch vehicle, such as a rocket, and launched into space. Control circuits initiate deployment of the small scale satellite at a time, orientation, etc. associated with the target orbit of each respective small scale satellite. Typically, a satellite is deployed by causing the dispenser door to open at a precise time, resulting in the small scale satellite being ejected from the dispenser and into orbit. Solar panels, antennae, and other appendages and auxiliary equipment may open, extend, or otherwise deploy once the small scale satellite has been ejected from the dispenser.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A small scale satellite dispenser with one or more externally adjustable payload restraints is disclosed. In various embodiments, a payload is held securely in place inside the dispenser by one or more externally adjustable spacers, sometimes referred to herein as a "tab" or "foot", positioned on the inside face of the door and/or the dispenser end plate and extending into the dispenser to an extent and/or applying to the payload a degree of force that is adjustable by applying a prescribed degree of torque to a input interface, such as a fastener and/or fastener head, accessible from an outside face of the door. In some embodiments, the prescribed torque may be determined empirically. For example, for a given payload, tests may be performed to determine how much the payload vibrates inside the dispenser under given conditions. In various embodiments, the feet are low profile to avoid interfering with satellite deployment.

Figure 1A:
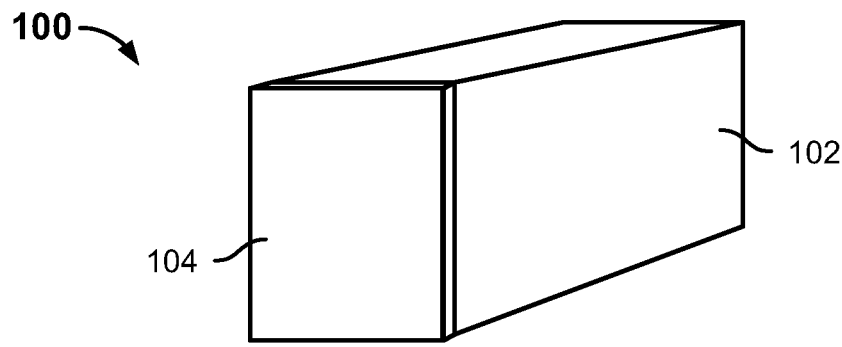
FIG. 1A is a diagram illustrating an embodiment of a small scale satellite dispenser.

FIG. 1A is a diagram illustrating an embodiment of a small scale satellite dispenser. In the example shown, dispenser 100 includes a dispenser casing or body 102 with a door 104 at one end. In the state shown in FIG. 1A, the dispenser door 104 is closed, as it would be subsequent to a small scale satellite being loaded into the dispenser 100 but before deployment.

Figure 1B:
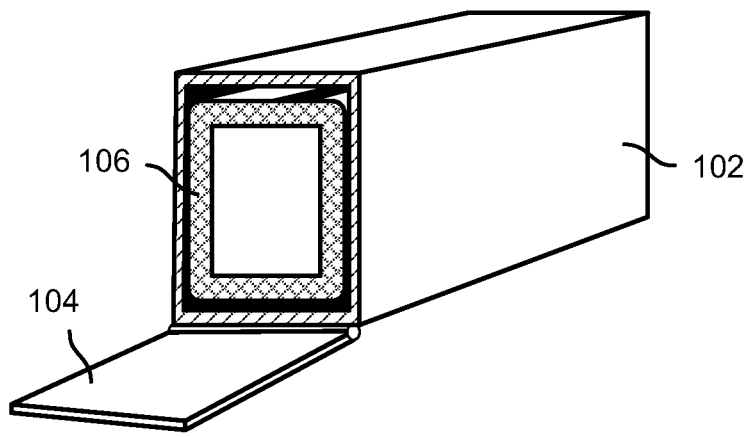
FIG. 1B is a diagram illustrating an embodiment of the small scale satellite dispenser 100 of FIG. 1A with the door 104 open.

FIG. 1B is a diagram illustrating an embodiment of the small scale satellite dispenser 100 of FIG. 1A with the door 104 open. A small scale satellite 106 is visible in the payload area defined by dispenser body 102. The state shown in FIG. 1B may be associated with loading the payload 106 into the dispenser 100, but prior to the door 104 being closed, and/or just prior to ejection of payload 106 after the door 104 being opened.

Figure 1C:
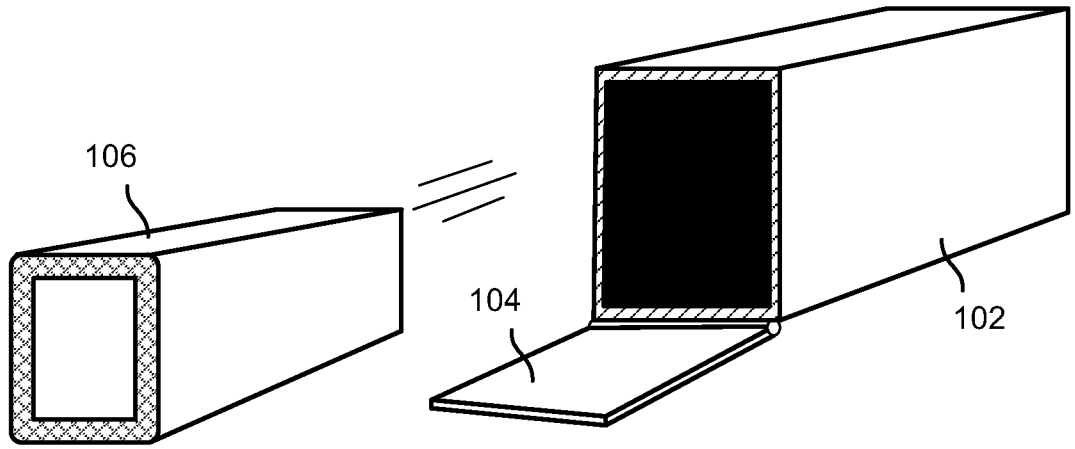
FIG. 1C is a diagram illustrating an embodiment of the small scale satellite dispenser 100 of FIG. 1A with the door 104 open and the payload 106 ejected from the payload area defined by dispenser body 102.

FIG. 1C is a diagram illustrating an embodiment of the small scale satellite dispenser 100 of FIG. 1A with the door 104 open and the payload 106 ejected from the payload area defined by dispenser body 102. In various embodiments, the payload 106 may have been ejected at least in part by a spring-loaded pusher plate against which the payload 106 had been pressed against during loading of payload 106 into dispenser 100, thereby compressing one or more springs associated with the pusher plate.

In various embodiments, the state of dispenser 100 as shown in FIGS. 1B and 1C is attained at least in part by activating a door release mechanism (not shown in FIGS. 1A through 1C) configured to hold door 104 in the closed position prior to activation. Upon activation of the door release mechanism, the door 104 is no longer held in the closed position. In various embodiments, one or more springs compressed by closing door 104 and securing door 104 in the closed position may, upon activation of the door release mechanism, cause the door 104 to be pushed open, as in FIGS. 1B and 1C, allowing the payload 106 to be ejected, as shown in FIG. 1C.

Figure 2A:
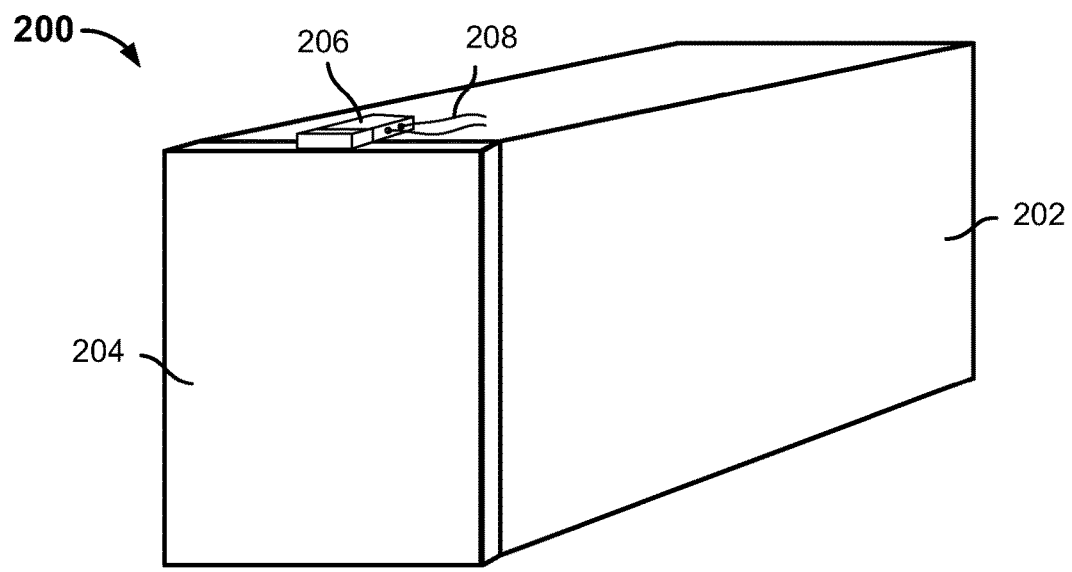
FIG. 2A is a diagram illustrating an embodiment of a small scale satellite dispenser provided with a pyrotechnic cutter door release mechanism prior to cutter activation.

FIG. 2A is a diagram illustrating an embodiment of a small scale satellite dispenser provided with a pyrotechnic cutter door release mechanism prior to cutter activation. In the example shown, satellite dispenser 200 includes a dispenser body 202 and door 204. The door 204 is held closed in the state shown by a door release mechanism 206 which in this example includes a wire or cable (not shown in FIG. 2A) to hold the door closed prior to deployment and two pyrotechnic cutters positioned and configured to cut the wire or cable to release the door 204 to enable the door 204 to open. In the example shown, electrical leads 208 are connected to the pyrotechnic cutters included in door release mechanism 206. In various embodiments, signals and/or power to activate the pyrotechnic cutters is/are provided via leads 208, e.g., from a driver or similar component comprising and/or otherwise associated with the dispenser 200.

Figure 2B:
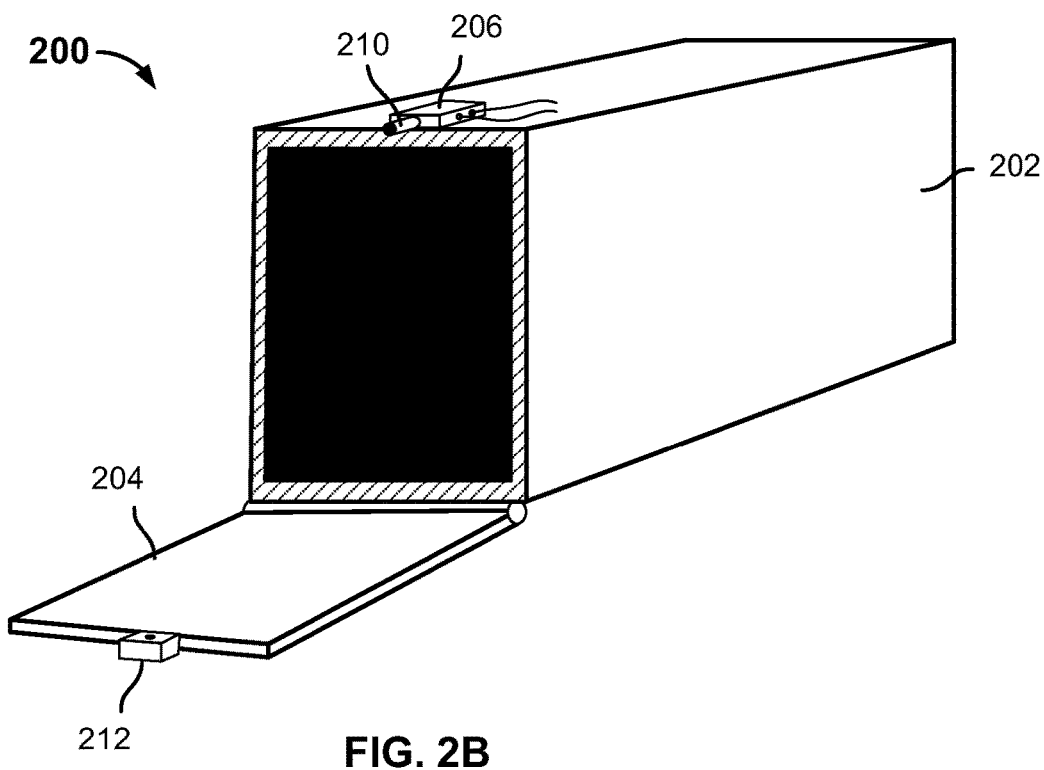
FIG. 2B is a diagram illustrating an embodiment of a small scale satellite dispenser provided with a pyrotechnic cutter door release mechanism after cutter activation.

FIG. 2B is a diagram illustrating an embodiment of a small scale satellite dispenser provided with a pyrotechnic cutter door release mechanism after cutter activation. In the state shown in FIG. 2B, the pyrotechnic cutters comprising door release mechanism 206 have been fired resulting in the cable or wire holding door 204 closed being cut. In the example shown, the door 204 has been assisted in opening by a spring-loaded pusher 210 being pushed out from the door release mechanism 206 once the wire or cable holding the door 204 shut had been cut. Also shown in FIG. 2B is a recess or cavity 212 into which a door side portion of the wire or cable that had been holding the door 204 closed has been pulled, e.g., by a spring-loaded plunger configured to extend into the cavity 212 pulling the door end of the cut wire or cable into cavity 212. In various embodiments, the wire or cable retraction mechanism configured to pull the free end of the cut wire or cable into cavity 212 ensures the loose (door) end of the cut wire or cable does not interfere with ejection and/or deployment of the small scale satellite from dispenser 200.

Figure 3A:
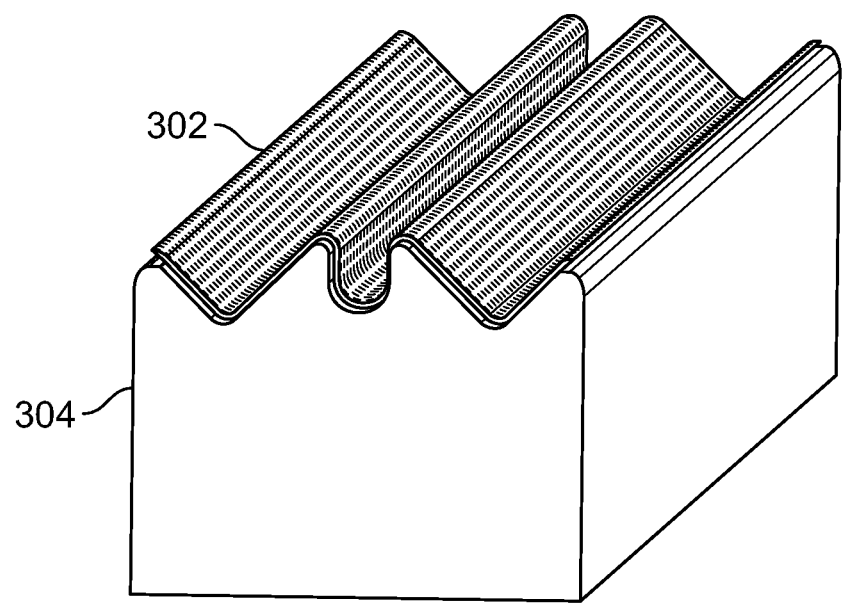
FIG. 3A is a diagram illustrating an embodiment of a composite guide rail and a mold to fabricate same.

FIG. 3A is a diagram illustrating an embodiment of a composite guide rail and a mold to fabricate same. In the example shown, layers 302 of carbon (or other) fiber reinforced fabric that has been pre-impregnated with a resin system, such as epoxy, are laid up on a mold 304. Mold 304 may be made of machined aluminum or another durable material with predictable thermal expansion behaviors for the elevated temperature at which the composite guide rail is cured.

In various embodiments, to form a composite guide rail as disclosed herein, the mold 304 is polished, laminate layers 302 are laid on top, the layers 302 are topped with a peel-ply perforated release film and breather material, and the assembly 302, 304 is placed in a vacuum bag. Once the mold 304 and laminate 302 are sealed in the vacuum bag, the bag is purged of all gasses with a vacuum pump. The assembly 302, 304 is cured in a high pressure, high temperature autoclave for the specified time required by the pre-preg laminates 302.

In various embodiments, composite guide rails as disclosed herein may be carbon composite rails with a layer of silicon carbide on the payload dispenser interface. The silicon carbide provides a very hard and smooth surface for the CubeSat rails to interface with. In some embodiments, a silicon carbide layer is laid right on top of the carbon fiber laminate layers (e.g., layers 302 in FIG. 3A) during the fabrication process.

Figure 3B:
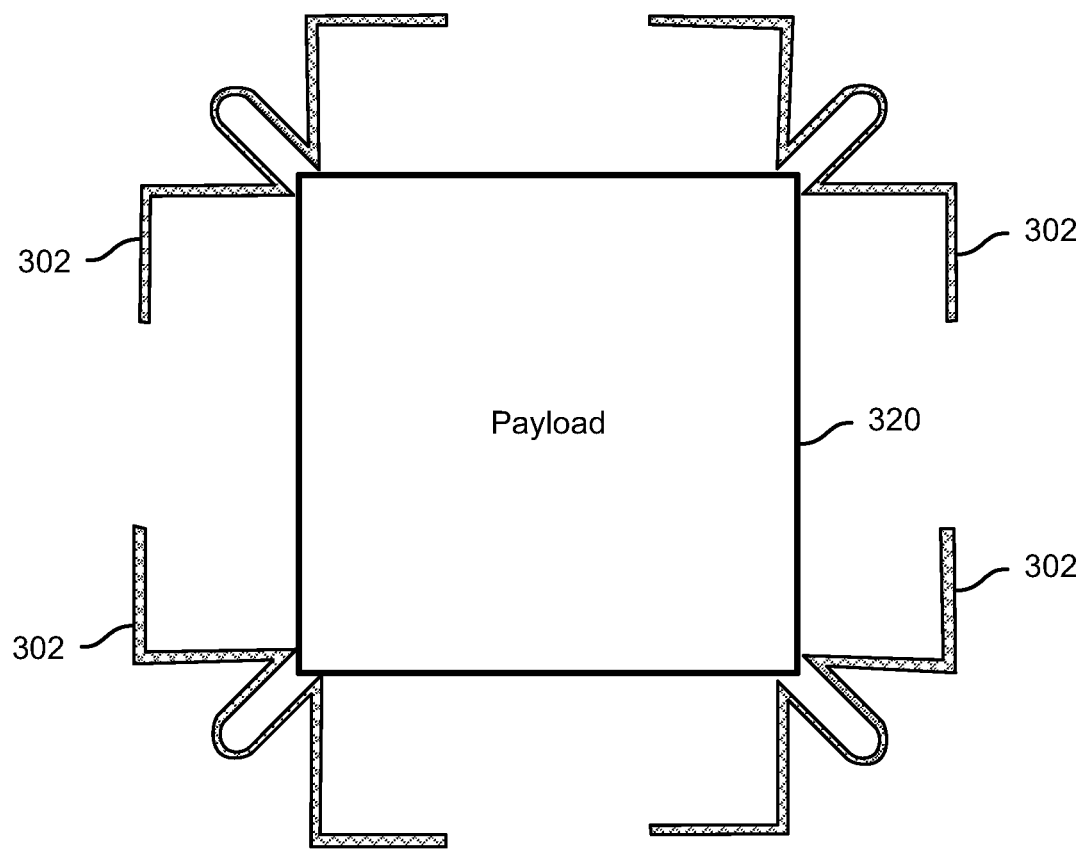
FIG. 3B is a diagram illustrating an embodiment of a satellite dispenser with composite guide rails.

FIG. 3B is a diagram illustrating an embodiment of a satellite dispenser with composite guide rails. In the example shown in FIG. 3B, a finished composite guide rail is shown in positions at the four corners of the satellite dispenser payload chamber (of the dispenser body, not shown in FIG. 3B. In various embodiments, the four corners of the payload 320, e.g., CubeSat rails or other small scale satellite corner/edge structures, engage and ride on the inner guide defined by the central lobe of the guide rail 302. In various embodiments, the silicon carbide layer on the side of guide rails 302 that face and engage the payload 320 enables the payload 320 to slide more freely along the guide rails 302, e.g., during satellite ejection and deployment.

Figure 4A:
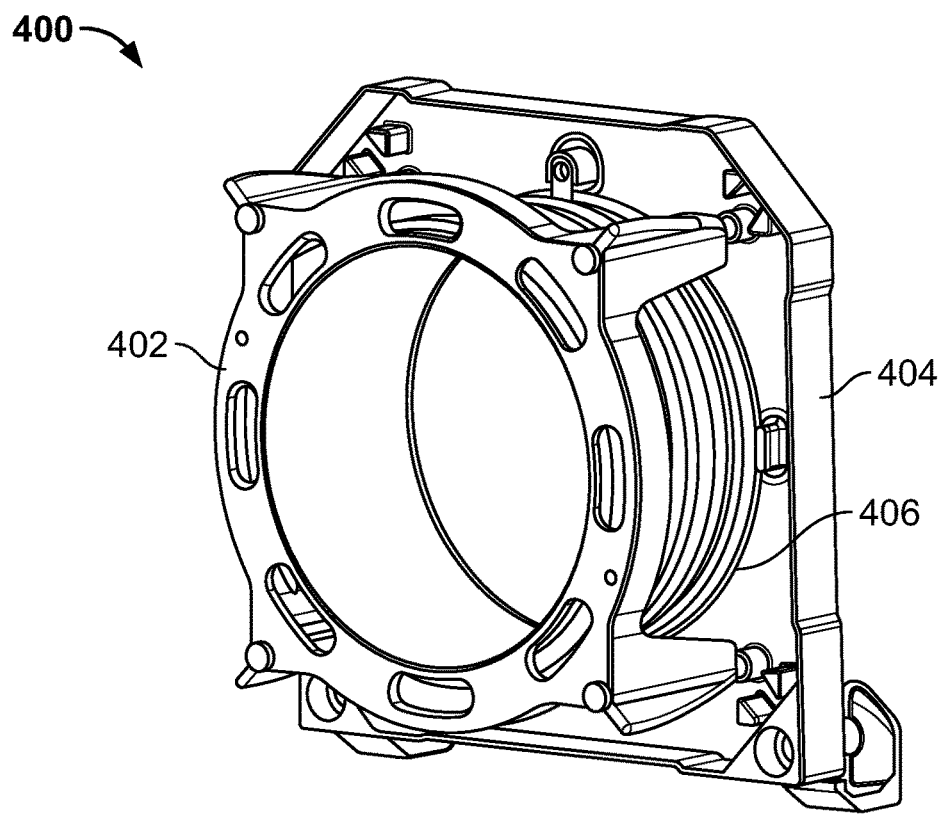
FIG. 4A is a diagram illustrating an embodiment of a satellite dispenser pusher plate assembly.

FIG. 4A is a diagram illustrating an embodiment of a satellite dispenser pusher plate assembly. In the example shown, pusher plate assembly 400 includes a pusher plate 402 coupled to a dispenser end plate or panel 404 by a spring 406. In various embodiments, a satellite loaded into a dispenser that includes pusher plate assembly 400 is pressed against the pusher plate 402, comprising spring 406, enabling the dispenser door to be closed. Upon release of the dispenser door to eject and deploy the satellite, the spring 406 extends and pushes pusher plate 402 in the direction of the dispenser door opening, which in turn pushes the satellite, riding on one or more guide rails, such as guide rails 302 of FIGS. 3A and 3B, out and through the dispenser door opening.

Figure 4B:
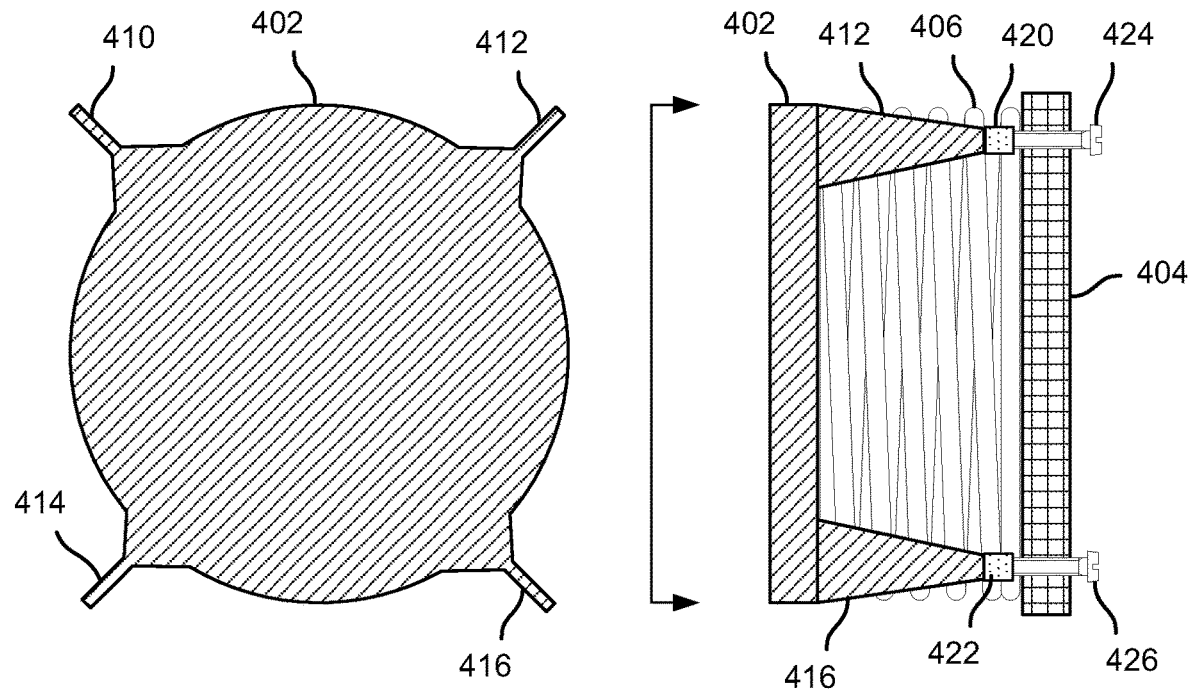
FIG. 4B is a diagram illustrating front and side views of the satellite dispenser pusher plate assembly 400 of FIG. 4A.

FIG. 4B is a diagram illustrating front and side views of the satellite dispenser pusher plate assembly 400 of FIG. 4A. As shown in FIG. 4B, the pusher plate 402 includes protrusions 410, 412, 414, and 416 at locations on pusher plate 402, each of which aligns, in various embodiments, with a corresponding groove comprising a guide rail (e.g., guide rail 302) positioned in an interior corner of a dispenser payload area.

In the example shown, protrusions 410, 412, 414, and 416 are formed as an integral part of the pusher plate 402 and extend back towards the end plate as tapered posts, the distal ends of which engage, when the dispenser is loaded and spring 406 is compressed, with corresponding nylon (or other polymer0 adjustable "feet", represented in FIG. 4B by feet 420 and 422. Each of the tapered posts comprising the four protrusions (410, 412, 414, 416) aligns opposite a corresponding one of the feet. Each of the feet (e.g., 420, 422) is adjustable in its extent into the payload area of the dispenser and/or the force applied to the pusher plate 402 via the protrusion 410, 412, 414, and 416 with which it is aligned by an adjustment screw (or similar structure), represented in FIG. 4B by adjustment screws 424 and 426. In various embodiments, the nylon (or other) feet 422, 424 and associated adjustment screws 424, 426 are torqued to a prescribed torque to secure the payload firmly in the payload area, e.g., to avoid movement during flight, which could damage the satellite.

Figure 5:
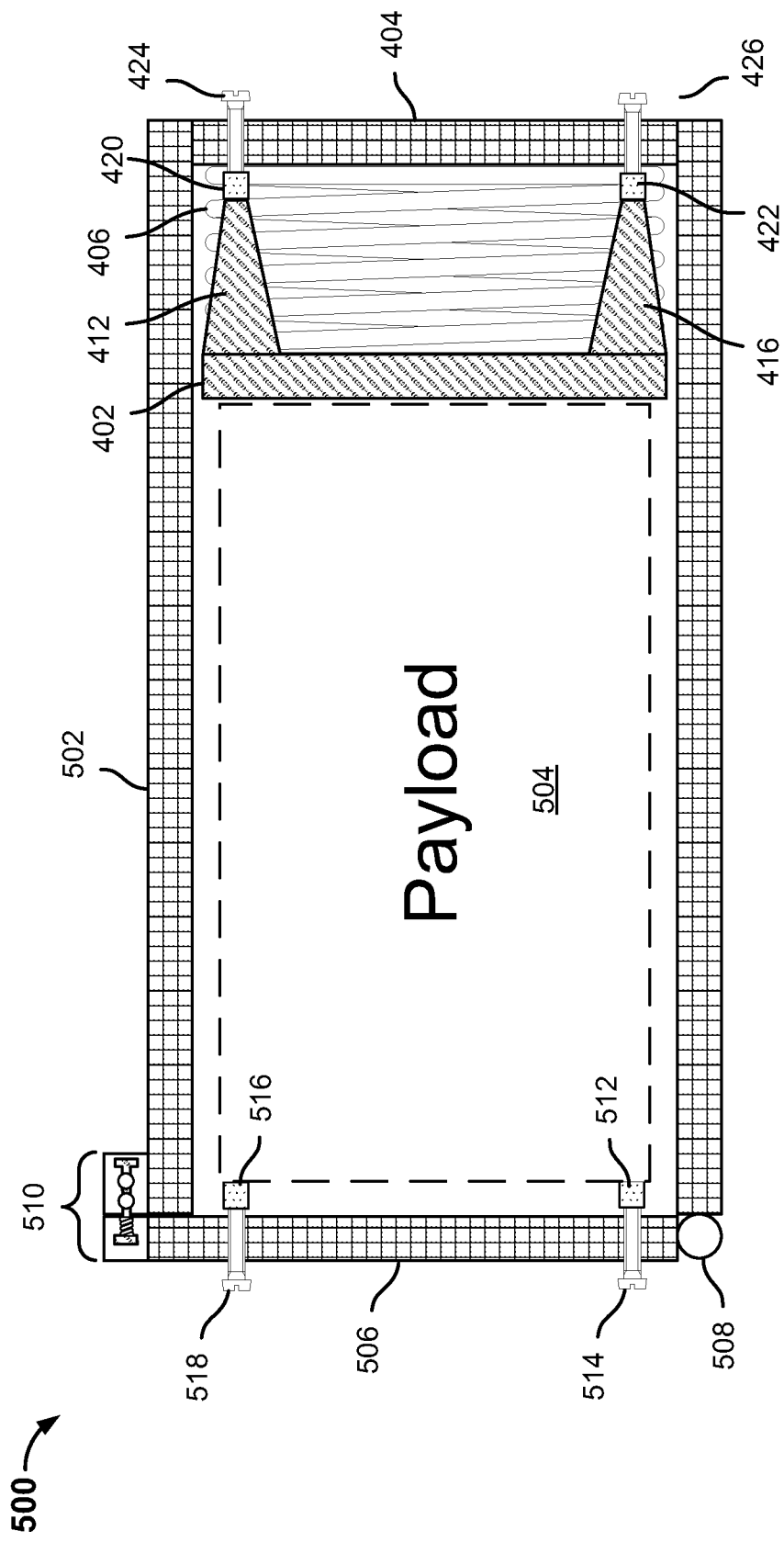
FIG. 5 is a diagram illustrating an embodiment of a satellite dispenser with externally adjustable payload restraint(s).

FIG. 5 is a diagram illustrating an embodiment of a satellite dispenser with externally adjustable payload restraint(s). In the example shown, the satellite dispenser 500 includes an interior payload area defined by four longitudinal side walls 502, end plate or panel 404, and door 506. As shown, a small scale satellite payload 504 is positioned in the dispenser 500. Door 506 is hinged at the bottom edge, as shown, at hinge 508 and is held closed in the state shown by door release mechanism 510. In the example shown, the payload 504 is held securely in place by adjustment of feet on the four protrusions of the pusher plate 402, represented in FIG. 5 by feet 420 and 422, and four feet at each corner of the inner face of door 506, represented in FIG. 5 by feet 512 and 516. In various embodiments, the respective external adjustment screws (or other external adjustment interfaces), represented in FIG. 5 by adjustment screws 424, 426, 514, and 518, are torqued, each to a prescribed torque, to ensure the payload 504 is held securely in place.

In various embodiments, at least the dispenser door feet, such as feet 512, 516, are shaped to have a low profile, e.g., not to extend too far beyond the inner face of the door 506, to minimize the risk of interference with ejection of the payload 504 once the door 506 is released and springs open.

In various embodiments, the degree of torque applied to the external adjustment screws (e.g., screws 424, 426, 514, and 518) is determined empirically, for example for a given payload and/or class or type of payload. For example, vibration sensors may be used to determine for each torque in a range of values and for a given stimulus applied to the dispenser 500 a corresponding amount of vibration that is imparted to the payload 504. An amount of torque determined to ensure vibration below a prescribed or design level is applied.

In various embodiments, structures and techniques disclosed herein ensures a payload is positioned securely within a dispenser, reducing the risk of damage to the payload due to excessive vibration during flight.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A satellite dispenser, comprising:
   a dispenser body defining an interior cavity to accommodate a payload;
   a plurality of externally adjustable restraints positioned within the interior cavity and configured to be extended further into the interior cavity by actuation of a manual interface external to the interior cavity;
   an end plate at a first end of the interior cavity, wherein at least a subset of the restraints are positioned on or in the end plate; and
   a pusher plate assembly positioned adjacent to the end plate, wherein the pusher plate assembly comprises a pusher plate having a plurality of posts and each of at least a subset of the posts is aligned with a corresponding one of the restraints positioned on or in the end plate.

2. The satellite dispenser of claim 1, wherein the manual interface is accessible when a payload has been loaded into the interior cavity through a dispenser door opening of the dispenser and a dispenser door of the dispenser has been closed.

3. The satellite dispenser of claim 1, wherein the respective externally accessible manual interfaces of the restraints positioned on or in the end plate extend through the end plate.

4. The satellite dispenser of claim 3, wherein the respective externally accessible manual interfaces of the restraints positioned on or in the end plate comprise adjustment screws.

5. The satellite dispenser of claim 1, wherein at least a subset of the restraints are positioned on or in a dispenser door of the dispenser.

6. The satellite dispenser of claim 5, wherein the respective externally accessible manual interfaces of the restraints positioned on or in the dispenser door extend through the dispenser door.

7. The satellite dispenser of claim 5, wherein the respective externally accessible manual interfaces of the restraints positioned on or in the dispenser door comprise adjustment screws.

8. The satellite dispenser of claim 1, wherein the restraints comprise nylon or another polymer.

9. The satellite dispenser of claim 1, wherein the restraints have a low profile to avoid interfering with ejection of a payload from the dispenser.

10. A method of loading a satellite dispenser, comprising:
    inserting a satellite into the satellite dispenser, wherein the satellite dispenser comprises:
    a dispenser body defining an interior cavity to accommodate the satellite;
    a plurality of externally adjustable restraints positioned within the interior cavity;
    an end plate at a first end of the interior cavity, wherein at least a subset of the restraints are positioned on or in the end plate; and
    a pusher plate assembly positioned adjacent to the end plate, wherein the pusher plate assembly comprises a pusher plate having a plurality of posts and each of at least a subset of the posts is aligned with a corresponding one of the restraints positioned on or in the end plate;

closing a dispenser door of the satellite dispenser to seal the satellite inside the satellite dispenser; and adjusting a plurality of externally adjustable manual interfaces, wherein each of the manual interfaces is associated with a corresponding one of the plurality of restraints, each of the manual interfaces is adjusted to corresponding a prescribed torque, and at least a subset of the plurality of restraints are correspondingly adjusted to a position at which the subset of the plurality of restraints secure the satellite.

11. The method of claim 10, wherein the prescribed torque is determined at least in part by iteratively applying varying amounts of torque, and for each torque applied performing a test to determine a measure of how securely the satellite is held in place.

12. The method of claim 11, wherein the test comprises a vibration test.

13. The method of claim 10, wherein the externally adjustable manual interfaces comprise screws or other fasteners.

14. The method of claim 10, wherein the plurality of restraints comprise nylon or other polymer feet.

15. The method of claim 10, wherein the plurality of externally adjustable manual interfaces and associated interior payload restraints are distributed at opposite ends of the satellite dispenser.

16. The method of claim 15, wherein the plurality of externally adjustable manual interfaces and associated interior payload restraints includes two or more externally adjustable manual interfaces and associated interior payload restraints at each of the opposite ends of the satellite dispenser.

* * * * *